United States Patent
Lee (10) Patent No.: US 9,266,306 B2
(45) Date of Patent: Feb. 23, 2016

(54) DECORATIVE ELEMENT WITH TPU FILM

(71) Applicant: JAY YIH ENTERPRISE CO., LTD., Taichung (TW)

(72) Inventor: Chi-Shih Lee, Taichung (TW)

(73) Assignee: Jah Yih Enterprise Co., Ltd., Taichung (TW)

( * ) Notice: Subject to any disclaimer, the term of this patent is extended or adjusted under 35 U.S.C. 154(b) by 48 days.

(21) Appl. No.: 14/140,124

(22) Filed: Dec. 24, 2013

(65) Prior Publication Data

US 2014/0113096 A1    Apr. 24, 2014

Related U.S. Application Data

(62) Division of application No. 13/404,084, filed on Feb. 24, 2012, now Pat. No. 8,894,788.

(51) Int. Cl.

| | |
|---|---|
| B32B 7/06 | (2006.01) |
| B32B 27/06 | (2006.01) |
| B32B 27/40 | (2006.01) |
| B32B 3/08 | (2006.01) |
| A43B 23/02 | (2006.01) |
| B32B 37/12 | (2006.01) |
| B32B 37/20 | (2006.01) |
| A45C 5/02 | (2006.01) |
| A45C 13/08 | (2006.01) |

(52) U.S. Cl.
CPC .............. *B32B 7/06* (2013.01); *A43B 23/0235* (2013.01); *A43B 23/0255* (2013.01); *B32B 3/085* (2013.01); *B32B 27/06* (2013.01); *B32B 27/40* (2013.01); *A45C 5/02* (2013.01); *A45C 13/08* (2013.01); *B32B 37/12* (2013.01); *B32B 37/206* (2013.01); *B32B 2305/34* (2013.01); *B32B 2307/412* (2013.01); *B32B 2451/00* (2013.01); *Y10T 156/1092* (2015.01); *Y10T 428/14* (2015.01); *Y10T 428/1476* (2015.01); *Y10T 428/1486* (2015.01); *Y10T 428/249941* (2015.04); *Y10T 428/249942* (2015.04); *Y10T 428/31551* (2015.04); *Y10T 428/31591* (2015.04)

(58) Field of Classification Search
CPC ...... B32B 25/08; B32B 27/40; B32B 38/145; B32B 38/10; B32B 37/12; B32B 2305/18; B32B 2375/00; Y10T 428/14; Y10T 428/1486; Y10T 428/24868; Y10T 428/24802
See application file for complete search history.

(56) References Cited

U.S. PATENT DOCUMENTS

| | | |
|---|---|---|
| 4,151,319 A | 4/1979 | Sackoff et al. |
| 6,013,351 A | 1/2000 | Mahn, Jr. |
| 8,003,197 B2 | 8/2011 | Yukawa et al. |

(Continued)

FOREIGN PATENT DOCUMENTS

| | | |
|---|---|---|
| CN | 2443860 Y | 8/2001 |
| TW | M334978 U | 6/2008 |
| TW | I341999 B | 5/2011 |

*Primary Examiner* — Patricia L Nordmeyer
(74) *Attorney, Agent, or Firm* — Alan D. Kamrath; Kamrath IP Lawfirm, P.A.

(57) ABSTRACT

A method for producing a decorative element includes the steps of: (a) preparing a thermoplastic polyurethane (abbreviated TPU) film, at least one ornament, and a releasing film coated with a glue layer on a plane thereof; (b) disposing the plane of the releasing film coated with the glue layer facing the ornament; (c) arranging the ornament located between the TPU film and the releasing film to form a stacked array; and (d) hot pressing the stacked array.

5 Claims, 8 Drawing Sheets

(56) References Cited

U.S. PATENT DOCUMENTS

2002/0136862 A1* 9/2002 Dong et al. .................. 428/150
2005/0233660 A1 10/2005 Kimbrell et al.
2008/0311349 A1 12/2008 Johnson et al.
2009/0252937 A1 10/2009 Zeik et al.
2011/0070409 A1 3/2011 Nishimaki et al.

* cited by examiner

Preparing a thermoplastic polyurethane (abbreviated TPU) film, at least one ornament, and a releasing film, which has been coated with a glue layer on a plane thereof.

Disposing the plane of the releasing film coated with the glue layer facing to the ornament Arranging the ornament located between the TPU film and the releasing film to form a stacked array.

Hot pressing the stacked array.

DECORATIVE ELEMENT WITH TPU FILM

CROSS REFERENCE

The present application is a division of U.S. application Ser. No. 13/404,084 filed on Feb. 24, 2012, now U.S. Pat. No. 8,894,788.

BACKGROUND OF THE INVENTION

1. Field of the Invention

The present invention relates generally to a decorative element and, more particularly, to a decorative element comprising a TPU film and methods for forming it.

2. Description of the Related Art

The design of commercial products has varied enormously. In addition, fashion has often dictated many design elements, such as products having uneven outsides, patterns, or trademarks sewn on the outside of products to make a certain style look attractive. Presently, the ornament sewn on the outside of products requires a large amount of manual labor for sewing.

Further, the ornament must previously reserve the outlet seam to provide a space to be sewn on the outside of products, so that a small size or complex ornament is hard and inconvenient to be sewn on the outside of products and increases manufacturing costs. Moreover, the ornaments sewn on the outside of products will form sewing traces arranged on the outside to make the products look promiscuous and unattractive.

Additionally, when the outside of the product is non-planar, processors cannot paste the protecting film onto the ornaments and outside of the product easily, and air bubbles will be formed between the protecting film and the outside of the product easily too.

The present invention is, therefore, intended to obviate or at least alleviate the problems encountered in the prior art.

SUMMARY OF THE INVENTION

According to the present invention, the main purpose is to provide a method for producing a decorative element includes the steps of: (a) preparing a thermoplastic polyurethane (abbreviated TPU) film, at least one ornament, and a releasing film, which has been coated with a glue layer on a plane thereof; (b) disposing the plane of the releasing film coated with the glue layer facing the ornament; (c) arranging the ornament located between the TPU film and the releasing film to form a stacked array; and (d) hot pressing the stacked array.

An advantage of the method for producing the decorative element according to the present invention is that the TPU film, the ornament, and the releasing film are connected with each other by hot pressing, thereby allowing the decorative element to be processed accurately, conveniently and in a cost-saving manner.

Another advantage of the decorative element according to the present invention is that the decorative element can be coupled to a desired place easily, quietly, and conveniently.

An additional advantage of the decorative element according to the present invention is that the TPU film is transparent and pervious to light, so that the ornament can be seen for aesthetic enjoyment.

Other objects, advantages, and new features of the present invention will become apparent from the following detailed description of the invention when considered in conjunction with the accompanied drawings.

BRIEF DESCRIPTION OF THE DRAWINGS

The illustrative embodiment may best be described by reference to the accompanying drawings where.

All Figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various Figures of the drawings, the same numerals designate the same or similar parts. Furthermore, when the terms "first", "second", "third", "inner", "outer", "side", "end", "portion", "section", "longitudinal", "clockwise", "counterclockwise", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

The present invention will be described through detailed illustration of embodiments referring to the drawings.

Figure 1:
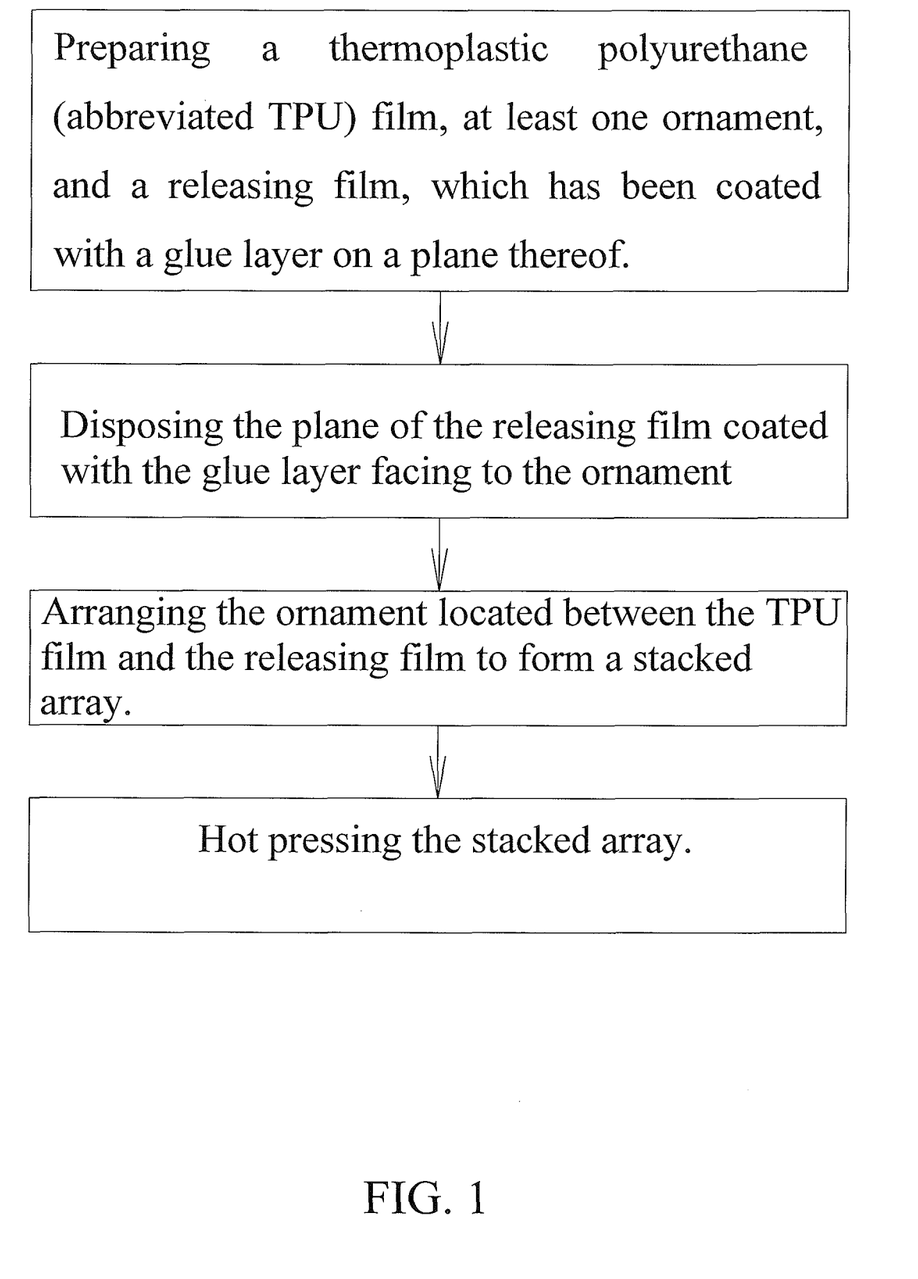
FIG. 1 is a flow chart of a method for producing a decorative element, in accordance with the present invention.

Referring to FIG. 1, a method for producing a decorative element includes the steps of: (a) preparing a thermoplastic polyurethane (abbreviated TPU) film, at least one ornament, and a releasing film coated with a glue layer on a plane thereof; (b) disposing the plane of the releasing film coated with the glue layer facing the ornament; (c) arranging the ornament located between the TPU film and the releasing film to form a stacked array; and (d) hot pressing the stacked array.

Figure 2:
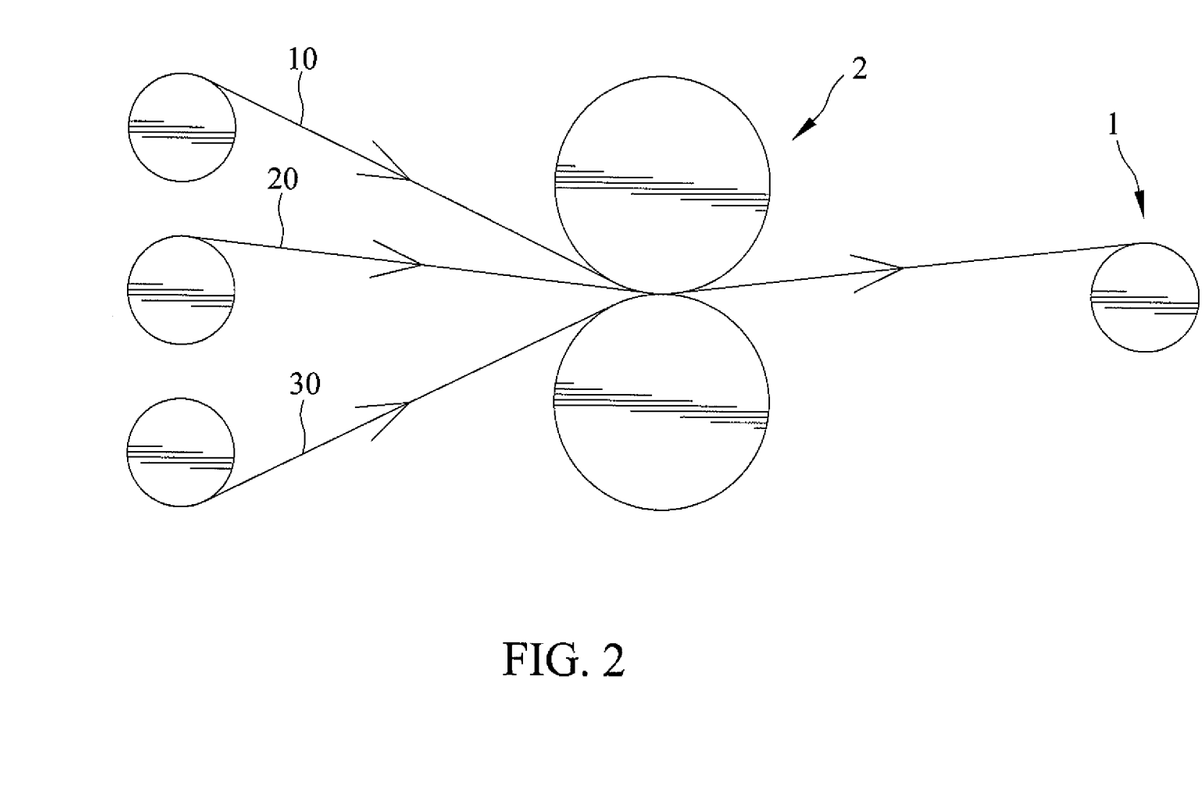
FIG. 2 is a side view of the decorative element in accordance with the present invention and shows a TPU film, an ornament, and a releasing film to be hot pressed by a hot press machine to produce the decorative element.
Figure 3:
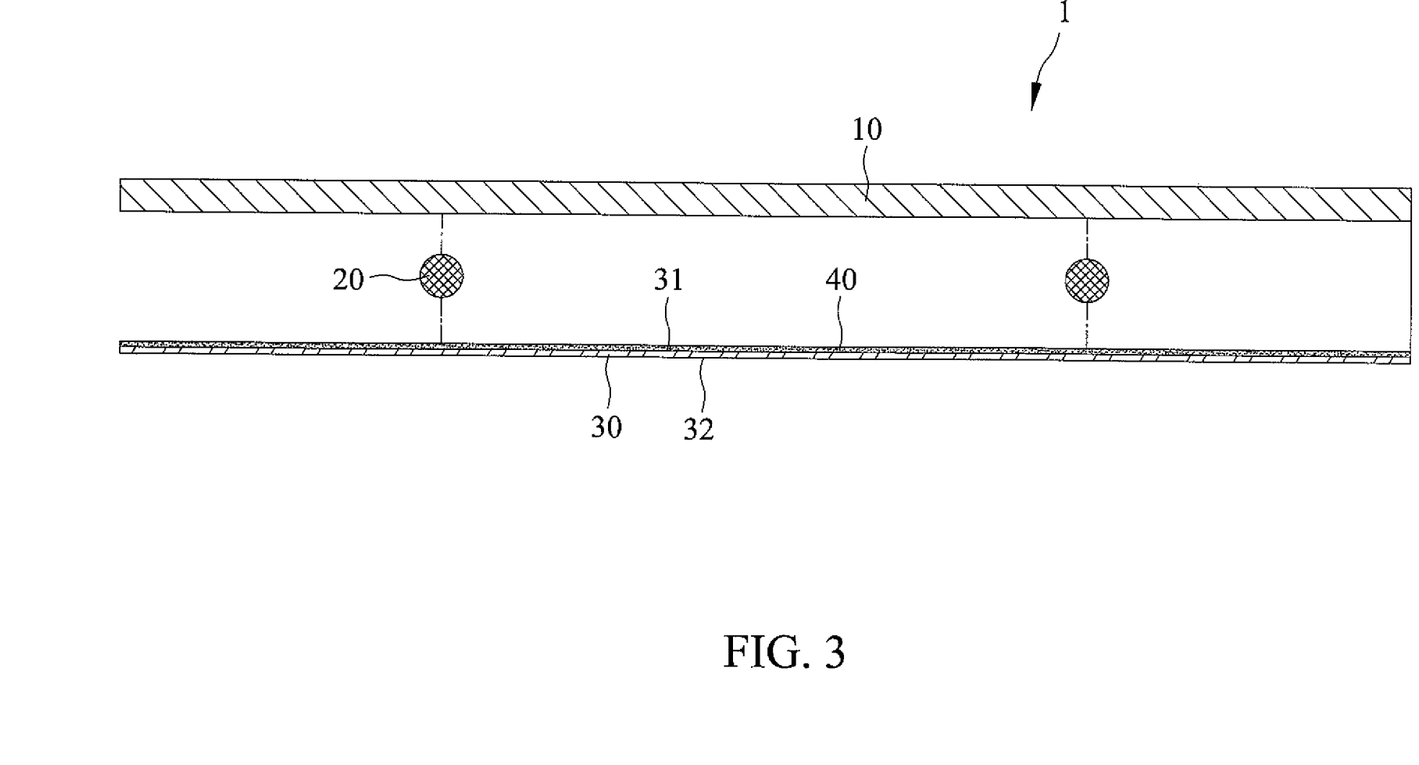
FIG. 3 is a cross-section view of the decorative element in accordance with the present invention and shows the TPU film, the ornament, the releasing film, and a glue layer arranged in a desired array before hot pressing.

Referring to FIGS. 2 through 3, there is shown a decorative element 1 in accordance with the present invention. The decorative element 1 is adapted for coupling with a desired place.

Step (a): preparing a roll of TPU film 10, at least one roll of ornament 20, and a roll of releasing film 30 coated with a glue layer 40 on a plane thereof. The TPU film 10 is transparent and pervious to light. The ornament 20 may be constructed of cotton thread or other decorative materials. The releasing film 30 includes first and second planes 31 and 32 disposed at two opposite ends thereof. The first plane 31 is adapted to be coated with the glue layer 40 and to face the TPU film 10.

Step (b): disposing the first plane 31 of the releasing film 30 coated with the glue layer 40 facing the ornament 20.

Step (c): arranging the ornament 20 located between the TPU film 10 and the first plane 31 to form a stacked array. The ornament 20 is located between the TPU film 10 and the first plane 31 of the releasing film 30 and contacted with the glue layer 40, so the ornament 20 is enclosed securely between the TPU film 10 and the releasing film 30 to form a stacked array.

Step (d): hot pressing the stacked array. The stack array is hot pressed by a hot pressing machine 2 to form the decorative element 1 to avoid air bubbles formed between the TPU film 10 and the releasing film 30. Additionally, the TPU film 10 is transparent and pervious to light, so that the ornament 20 can be seen for aesthetic enjoyment.

Figure 4:
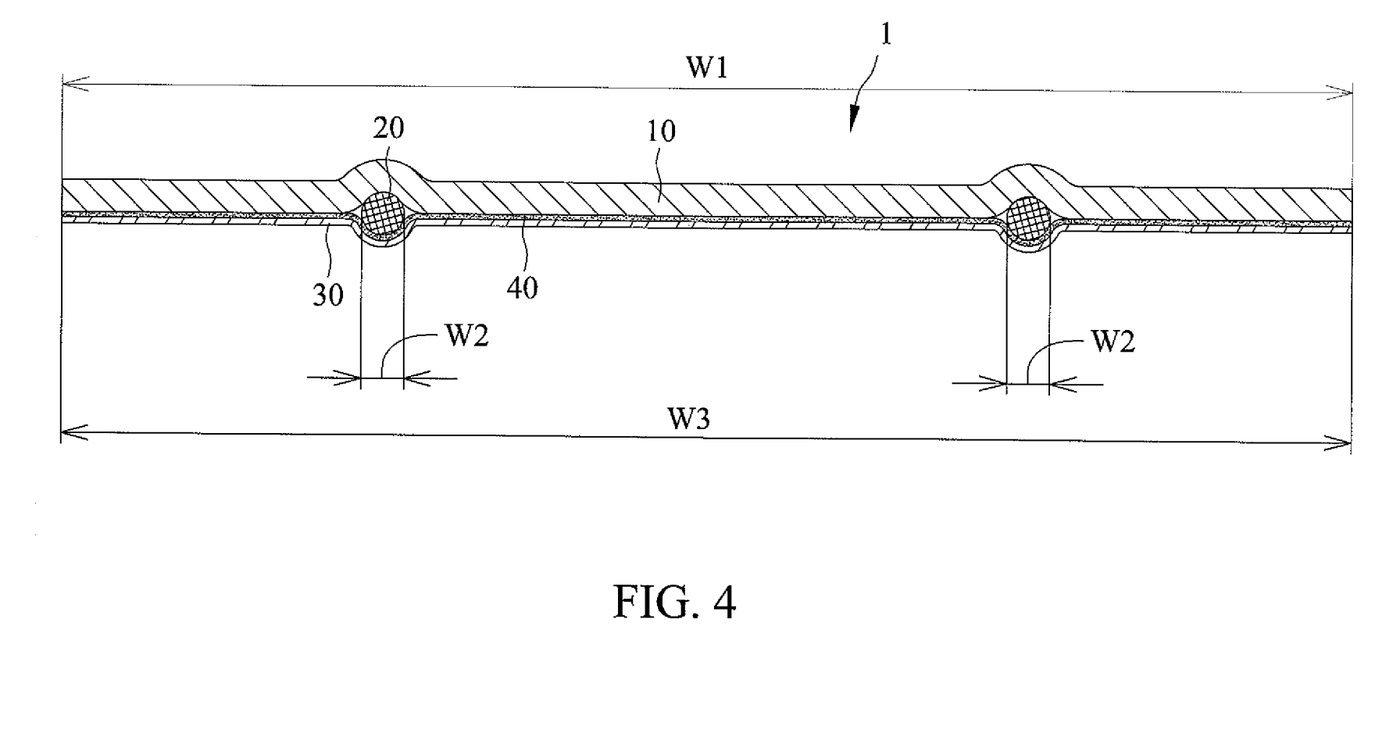
FIG. 4 is a cross-section view of the decorative element in accordance with the present invention and shows the TPU film, the ornament, the releasing film, and a glue layer arranged in the desired array after hot pressing to form the decorative element.
Figure 5:
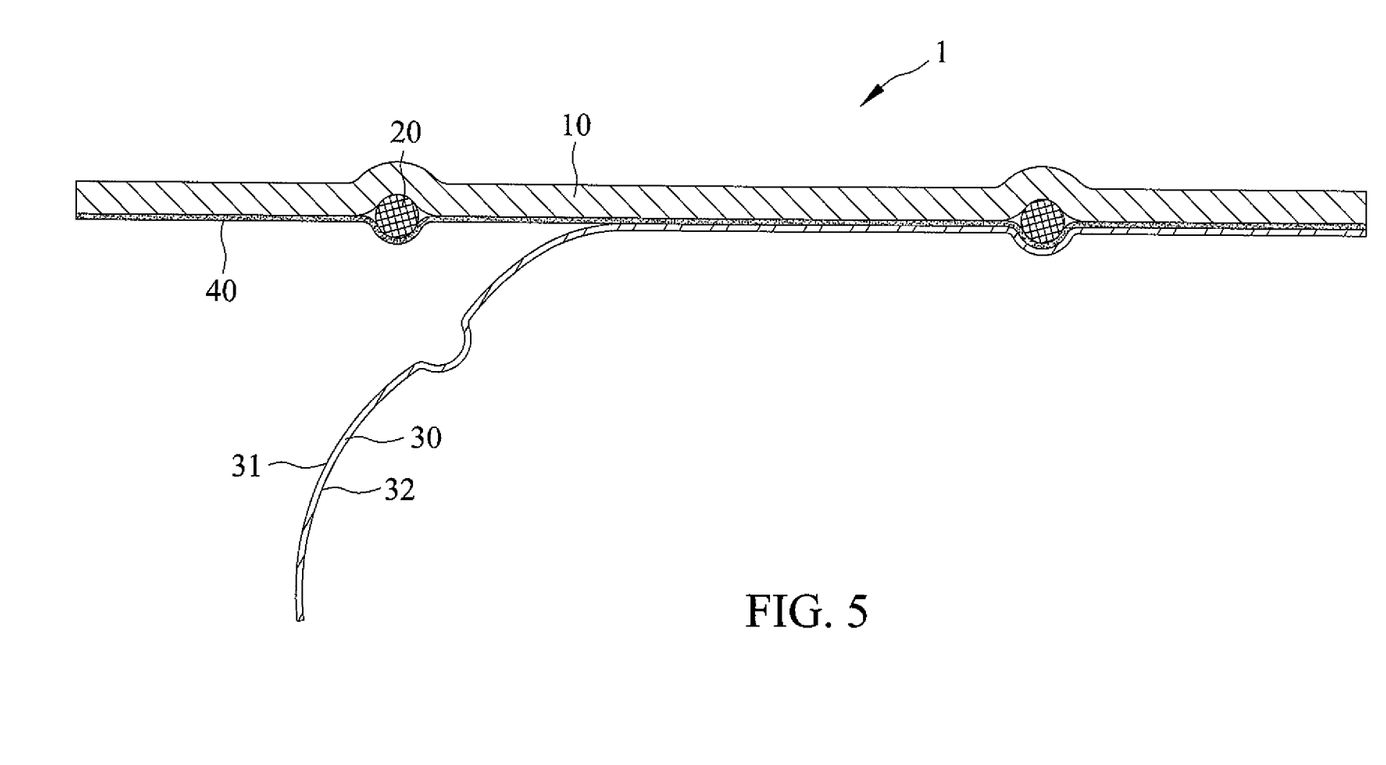
FIG. 5 is a cross-section view of the decorative element in accordance with the present invention and shows the releasing film to be stripped therefrom.

Referring to FIGS. 4 through 5, the TPU film 10 defines a first width W1. The ornament 20 defines a second width W2. The releasing film 30 defines a third width W3. The first width W1 is equal to the third width W3 generally, and the second width W2 is less than the third width W3, so that the TPU film 10 and the releasing film 30 coated with the glue layer 40 contact each other with a big contact area resulting in the ornament 20 enclosed securely between the TPU film 10 and the releasing film 30. Moreover, the releasing film 30 can be stripped from the glue layer 40, so that the decorative element 1 is adapted for coupling with a desired place easily and conveniently.

Figure 6:
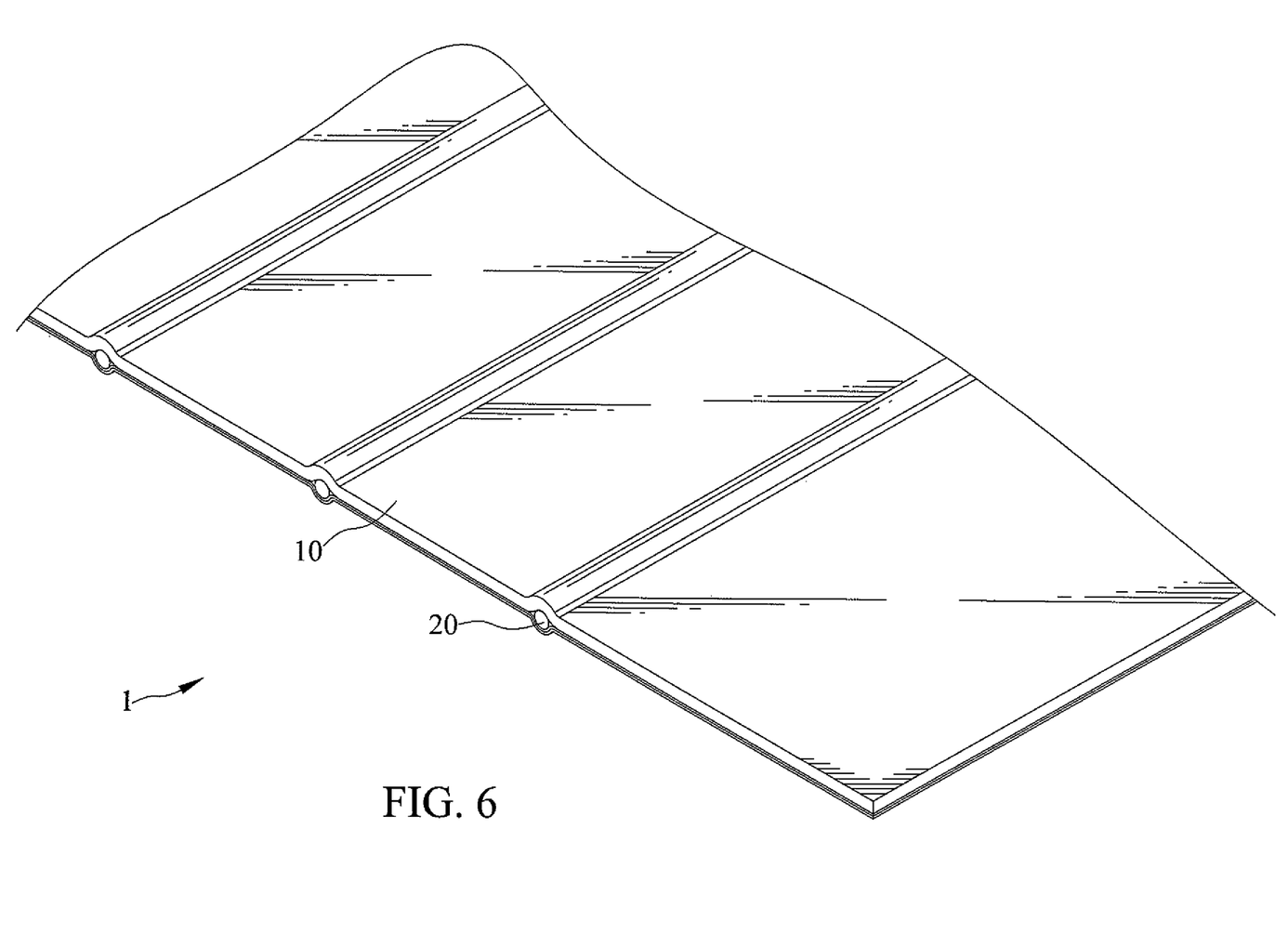
FIG. 6 is a perspective view of the decorative element in accordance with the present invention.
Figure 7:
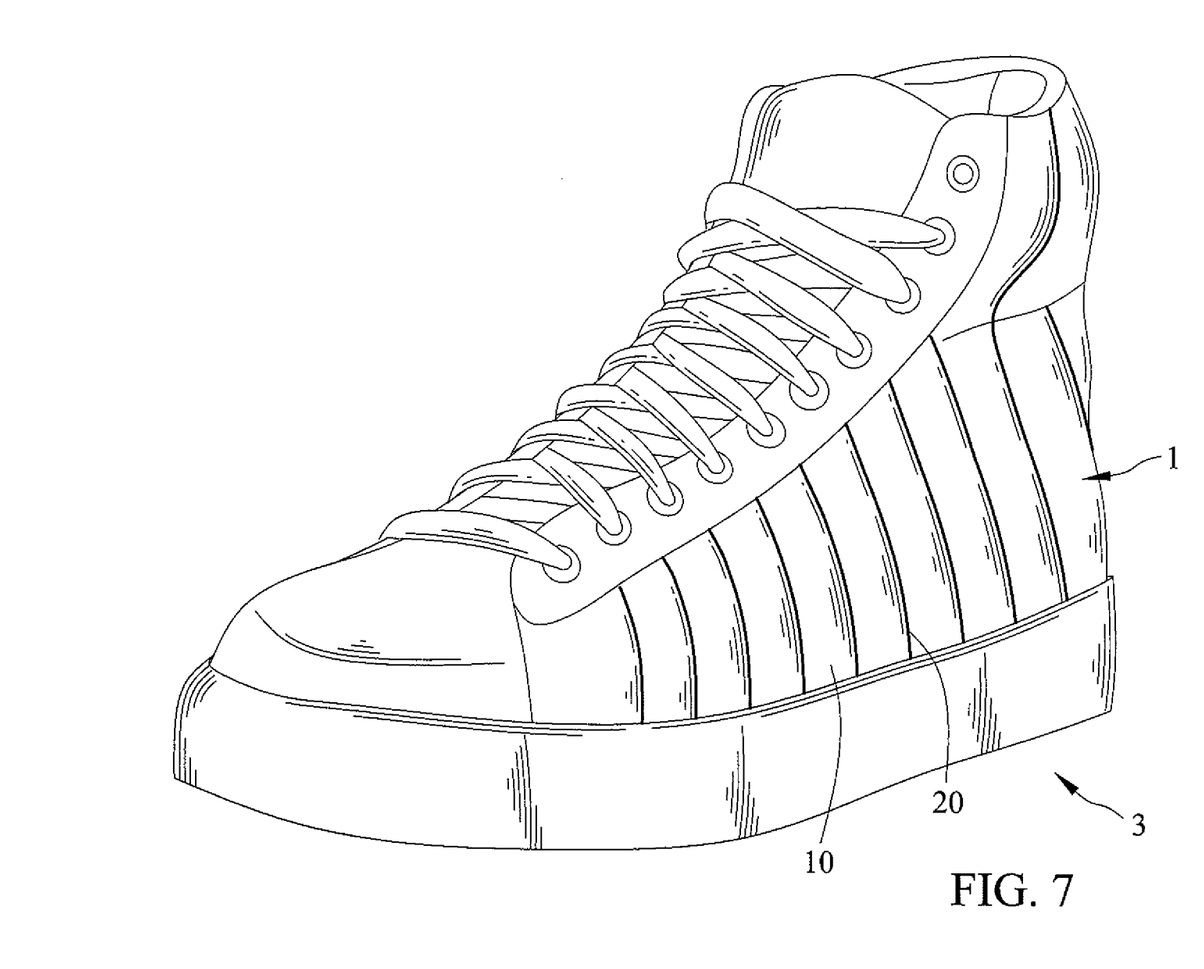
FIG. 7 is a perspective view of the decorative element in accordance with the present invention and shows the decorative element to be applied to a shoe.
Figure 8:
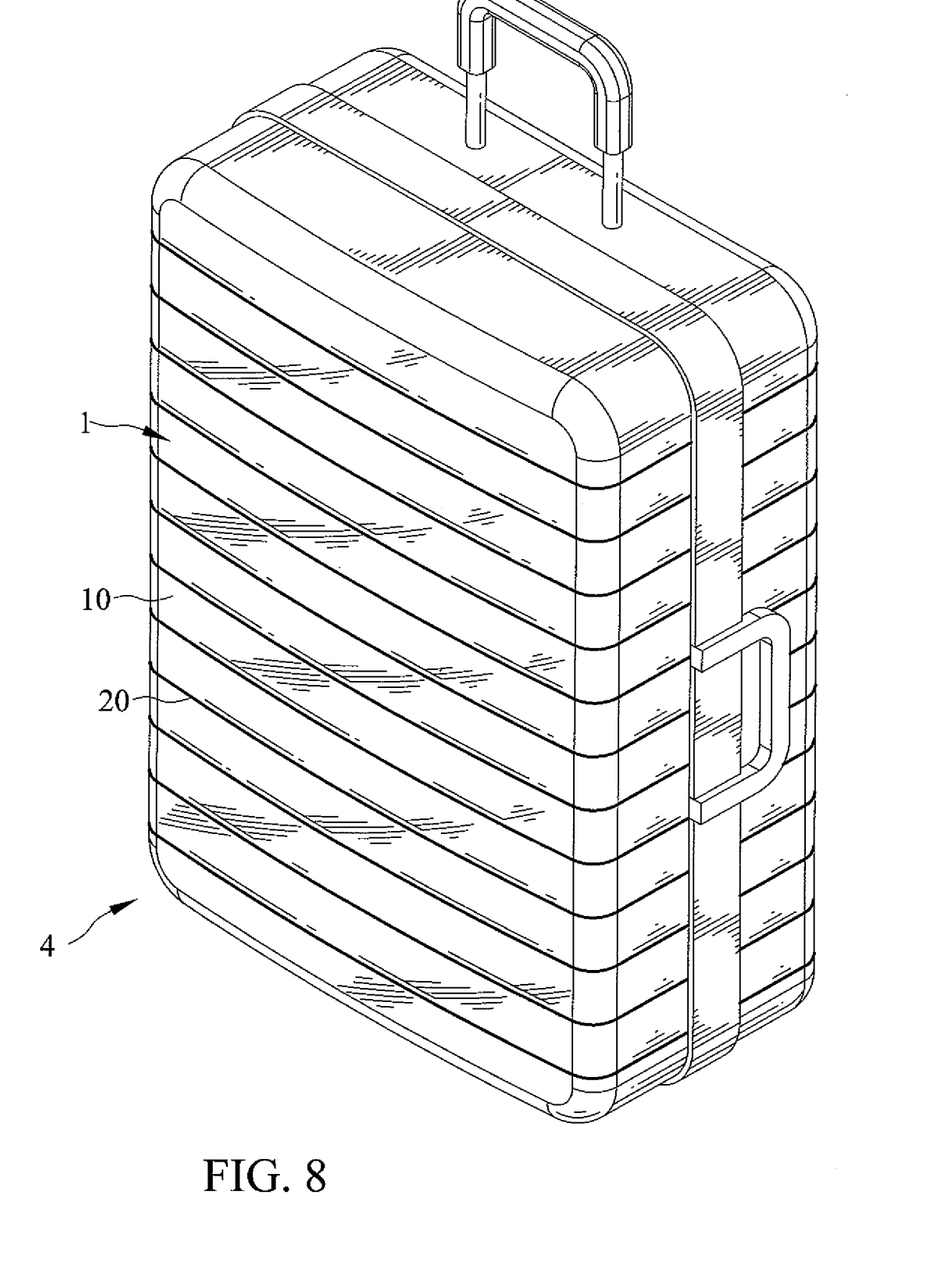
FIG. 8 is a perspective view of the decorative element in accordance with the present invention and shows the decorative element to be applied to luggage.

Referring to FIGS. 6 through 8, they respectively show the decorative element 1 to be applied to a shoe 3 and luggage 4, with the ornament 20 shown in FIGS. 6 through 8 consisting of multiple, spaced threads free of interconnection therebetween. The decorative element 1 is adapted for coupling with a desired place such as a vamp of a shoe 3 or outside of luggage 4 easily, quietly, and conveniently, and can be adjustable with quantity and configuration.

In view of the foregoing, an advantage of the method for producing the decorative element 1 according to the present invention is that the TPU film 10, the ornament 20, and the releasing film 30 are connected with each other by hot pressing, thereby allowing the decorative element 1 to be processed accurately, conveniently and in a cost-saving manner.

Another advantage of the decorative element 1 according to the present invention is that the decorative element 1 can be coupled to a desired place easily, quietly, and conveniently.

An additional advantage of the decorative element 1 according to the present invention is that the TPU film 10 is transparent and pervious to light, so that the ornament 20 can be seen for aesthetic enjoyment.

Thus since the invention disclosed herein may be embodied in other specific forms without departing from the spirit or general characteristics thereof, some of which forms have been indicated, the embodiment described herein is to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A decorative element comprising:
a thermoplastic polyurethane (TPU) film;
an ornament consisting of multiple, spaced threads free of interconnection therebetween; and
a releasing film includes first and second planes disposed at two opposite ends thereof, with the first plane coated with a glue layer and facing the TPU film;
wherein the ornament is located between the TPU film and the first plane of the releasing film and contacted with the TPU film and the glue layer.

2. The decorative element as claimed in claim 1, wherein the TPU film is transparent and pervious to light.

3. The decorative element as claimed in claim 1, wherein the ornament is multiple, spaced, cotton threads.

4. The decorative element as claimed in claim 1, wherein the ornament is decorative material.

5. The decorative element as claimed in claim 1, wherein the TPU film defines a first width, wherein the ornament defines a second width, wherein the releasing film defines a third width, wherein the first width is equal to the third width, and wherein the second width is less than the third width.

* * * * *